Jan. 23, 1968    J. C. MELLINGER    3,365,582
TIMING CONTROL SYSTEM
Original Filed Dec. 13, 1962    2 Sheets-Sheet 1

JOHN C. MELLINGER
INVENTOR.

BY
William G. Landwier
AGENT

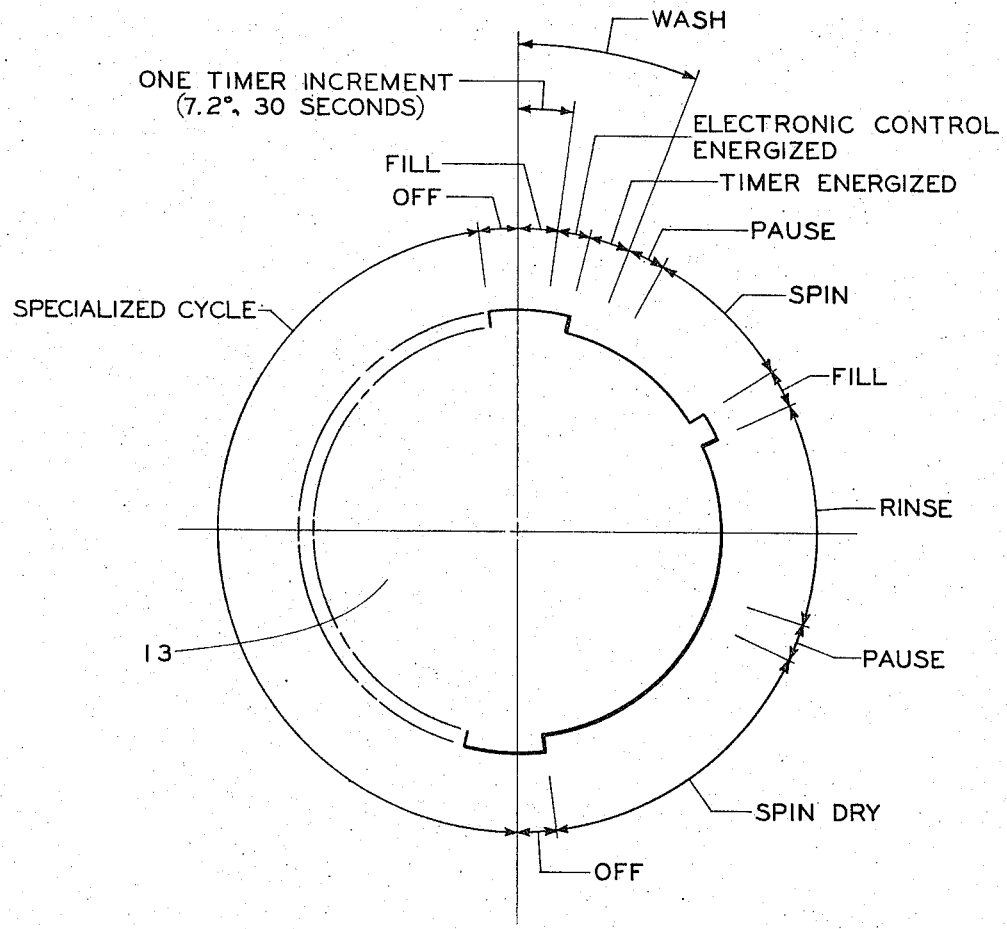

3,365,582
TIMING CONTROL SYSTEM
John C. Mellinger, 803 S. 14th Ave. W.,
Newton, Iowa 50208
Continuation of application Ser. No. 244,498, Dec. 13, 1962. This application Apr. 6, 1966, Ser. No. 547,695
9 Claims. (Cl. 307—141)

This is a continuation of application Ser. No. 244,498, now abandoned, filed Dec. 13, 1962.

This invention relates to controls for sequencing an apparatus through a cycle of operations, and more particularly to a timing system which increases the total available time cycle and provides means for varying the duration of individual operations.

As is well known, automatic washers, automatic driers, and automatic washer-drier combinations are expected to perform an ever-increasing number of special cycles. For example, an automatic washing machine is expected to perform the customary washing sequence including wash, rinse, and spin dry operations in varying lengths of cycle time. In a particular example, the automatic washing machine is expected to provide a regular washing cycle with a wash time of approximately ten minutes and also a speical washing cycle for delicate fabrics in which a shortened washing operation is desired of approximately three to five minutes. In addition, these variations in cycle must be operative without periodic resetting or adjustment of the controls by the operator during the cycle.

In addition to these regular washing cycles with varying lengths of washing time, automatic washing machines are expected to perform specialized washing cycles which do not strictly correspond to the normal sequence of operations, as indicated above. Two specific examples of such specialized cycles are the "wash and wear" cycle and the "wool" cycle.

These requirements for variable operation times and specialized cycles impose severe manufacturing and operational problems on the conventional cam-type timer mechanism as found in home laundry appliances. The basis of the problem is the limitation of the number of increments which may be satisfactorily placed on the cam profile. The number of increments can, of course, be increased by reducing the angular size of each, but this approach is not satisfactory because the small increments create manufacturing and operational tolerance problems.

The instant invention provides an improved timing system including electronic timing means which is energized to provide predetermined time increments during periods of deenergization of the timer mechanism. The total controlled time cycle is thus the sum of that achieved from the timer mechanism and the predetermined cycle duration of the electronic timing means; however, only that portion of the total cycle which is controlled by the timer mechanism requires space on the cam profile. In addition, the electronic timing means includes means for achieving predetermined time increments of varying duration.

Thus it is an object of this invention to condense the space required on the cam profile for the normal cycle of operations without reducing the size of each increment. This will allow the placing of additional cycles of operations such as specialized cycles on the remaining portion of the cam.

It is another object of this invention to provide a timing control having means for increasing the effective control time of the timer mechanism by incorporating a secondary timing means for maintaining the primary timing mechanism de-energized for predetermined periods of time during extended periods of non-switching by the timer mechanism thereby permitting the normal cycle of operations to be placed on a smaller portion of the cam profile and leaving a portion available for at least one specialized cycle.

It is a further object of the invention to provide an auxiliary or secondary timing means of the R–C circuit type which is operable in cooperation with the conventional timing mechanism for obtaining increased cycle duration and greater cycle variations.

It is a still further object of the invention to provide an auxiliary or secondary timing means which includes means for varying the length of selected operations performed by the controlled apparatus.

Further objects and advantages of this invention will become evident as the description proceeds and from an examination of the accompanying drawings which illustrate a preferred embodiment of the invention and in which similar numerals refer to similar parts throughout the several views.

In the drawings:

FIGURE 2 is an enlarged view of one of the cams of FIGURE 1 showing the various individual operations included in the complete washing cycle and also the placing of the cycle on the cam profile so as to allow an additional auxiliary or specialized cycle to be placed on the same cam profile.

Figure 1:
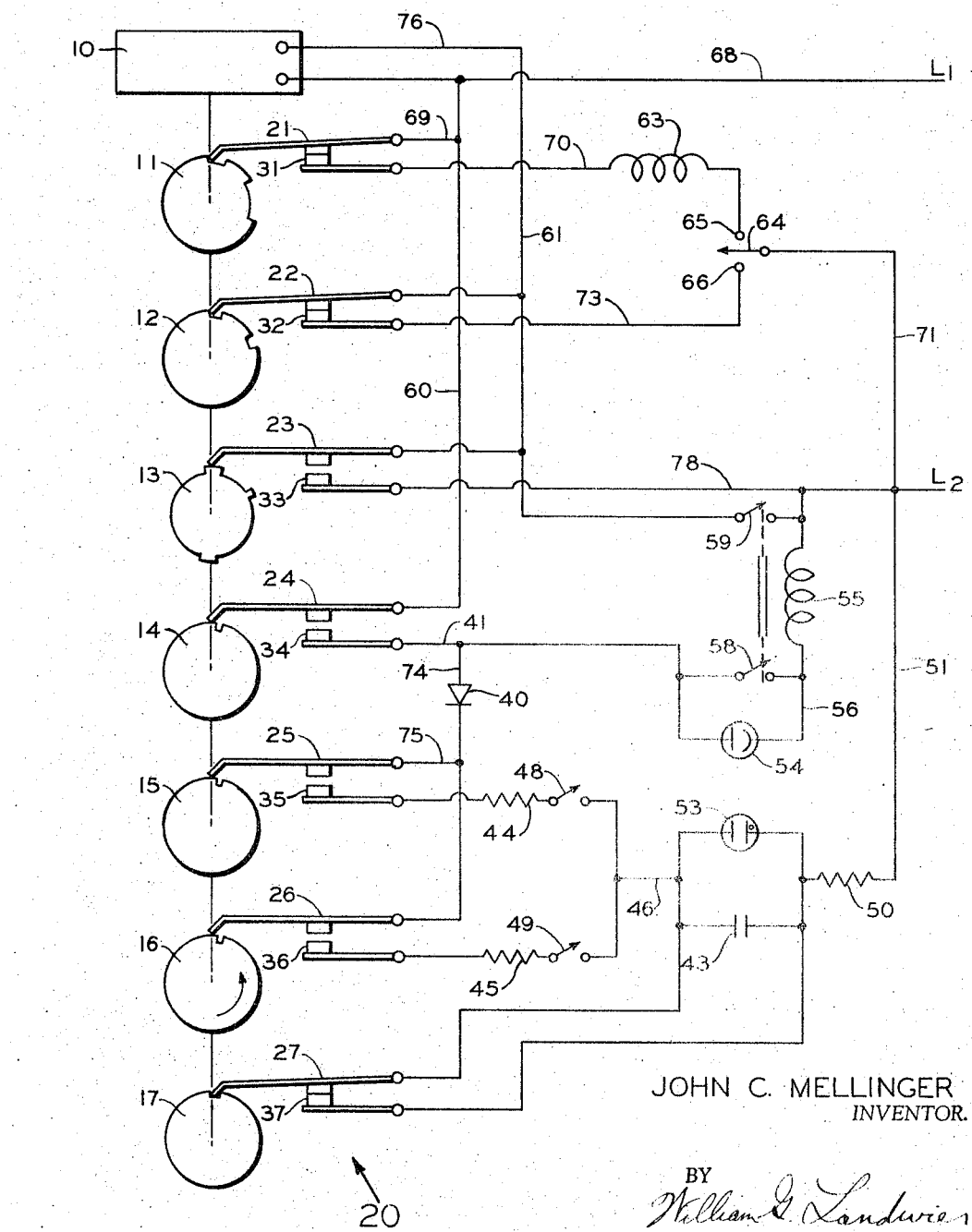
FIGURE 1 is a diagrammatical illustration showing a portion of the timer mechanism including cams thereof, and the schematic circuit, including electronic timing means, of a preferred embodiment of the present invention.

As seen in FIGURE 1 the timing system includes a conventional cam-type timer mechanism 20 driven by timer motor 10 and including cams 11 through 17. Additional cams (not shown) are included in the timer mechanism for controlling other electrically operated devices which do not form a part of this invention. Controlled by the timer cams 11 through 17 are timer switches 21 through 27 for making and breaking electrical continuity with timer switch contacts 31 through 37. These cams, switches, and contacts provide the necessary means for energizing various control system components of the controlled apparatus including the timer mechanism and the electronic timing means.

The conventional timing mechanism 20 driven by timer motor 10 provides the means for making and breaking selected switches for energizing various electrical components in a predetermined sequence during the washing cycle. FIGURE 1 shows only that part of the circuit which is related to the initial actuation of the machine and to the deenergization of the timer mechanism and the energization of the electronic timing means. Other electrical components normally found on home laundry appliances, including the drive motor, auxiliary motors, and lighting devices, for example, may be placed in the electrical circuit between power lines $L_1$ and $L_2$ along with the necessary switches, timer cams, and timer switch contacts for controlling the energization of said components.

The electronic timing system of the present invention consists of an R–C timing circuit which includes a selenium half-wave rectifier 40 connected on one side to line 41 and connected on the other side to capacitor 43 through parallel circuits which include timer switches 25 and 26 made to contacts 35 and 36, resistors 44 and 45, switches 48 and 49, and line 46. The other side of capacitor 43 is connected to power line $L_2$ through resistor 50 and line 51.

It will be seen in FIGURE 1 that the capacitor 43 is charged by a direct current circuit including resistance 44 or 45, and resistance 50. The rate at which the capacitor 43 is charged depends, among other factors, upon the value of these resistors 44, 45 and 50. It is thus obvious that a variable charging time may be achieved by providing variable resistance or a number of resistors of varying values. In the present embodiment two such resistors, resistors 44 and 45, are provided along with switch members 48, 49 for selective energization in the charging circuit to the capacitor 43. Though the present embodiment discloses two such resistors, it is obvious that additional resistors may be provided to achieve further variations in the charging time.

It will also be noted in FIGURE 1 that across capacitor 43 is a parallel circuit including cam 17, timer switch 27, and switch contact 37. The closing of switch 27 to contact 37 during the timer increment prior to energization of the electronic circuit insures the discharge of capacitor 43 to the same degree prior to each timing cycle.

A gaseous discharge tube, such as a neon lamp 53, is connected across capacitor 43. Neon lamp 53 normally has an infinite resistance; however, when the charge on the capacitor 43 reaches a predetermined value, the gas within neon lamp 53 is ionized and the circuit is conducted therethrough to produce a visible light discharge.

A light sensitive cell, such as photoelectric cell 54, is positioned to detect the discharge of neon lamp 53. One side of the photoelectric cell 54 is connected to line 41, and the other side is connected to relay 55 by line 56. The other side of relay 55 is connected to power line $L_2$. Normally, when dark, the light sensitive photoelectric cell 54 has a very high resistance. However, when illuminated, its resistance is greatly reduced and thus allows the circuit to be completed to relay 55.

Relay 55 operates switches 58 and 59. Switch 58 completes a holding circuit in parallel with photoelectric cell 54 in order to maintain relay 55 energized. The holding circuit is from power line $L_1$ through line 68 to line 60, through timer switch 24 made to contact 34, through line 41 and switch 58 and line 56 to one side of relay 55. The other side of relay 55 is connected to power line $L_2$. When switch 59 is closed the timer motor is energized by a circuit from power line $L_1$, through line 68 to timer motor 10, through line 76 and 61, and through switch 59 to power line $L_2$.

The electrical circuit for this invention as disclosed in FIGURE 1 is supplied between power lines $L_1$ and $L_2$ with the standard household 110 volts 60 cycle electrical power.

In this embodiment of the instant invention, the electronic timing means is energized during the washing operation, during which time no switching is required of the timing mechanism. The duration of the washing operation will thus be dependent upon the timing mechanism and the electronic timing means as will be more fully explained hereinafter.

Actuation of this timing means, as disclosed for use in an automatic washing machine, for example, may be accomplished by manually setting selected switches and advancing the timer to the indicated start position or by an automatic control system for selecting a programmed group of operations in which the manual selection of a single button energizes the automatic washing machine for a given set of operations. Such an automatic control system is disclosed in United States patent to John C. Mellinger, No. 3,011,079, issued Nov. 28, 1961, and assigned to the assignee of the instant invention.

Upon selection of the desired cycle of operations, the machine will be energized and will proceed to fill with washing fluid. The fill valve is energized from power line $L_1$ through lines 68 and 69, through timer switch 21 made to contact 31, and through line 70 to one side of solenoid 63. The other side of solenoid 63 is connected to power line $L_2$ through diaphragm actuated switch 64 made to contact 65, and through line 71. When washing fluid within the washing machine reaches the proper level, diaphragm actuated switch 64 will open at contact 65 and move to contact 66 for energizing timer motor 10 of timer mechanism 20. Timer motor 10 is thus energized in a circuit which is fed from power line $L_1$ through line 68 to one side of the timer motor. The other side of the timer motor 10 is connected to power line $L_2$ through line 76, line 61, timer switch 22 made to contact 32, line 73, contact 66 of diaphragm actuated switch 64, and line 71.

The timer motor thus energized will then advance the cam stack one increment and open switch 22 at contact 32 and close timer switches 24, 25, and 26 to contacts 34, 35, and 36. The opening of timer switch 22 at contact 32 will de-energize timer motor 10 and the closing of switches 24, 25, and 26 to contacts 34, 35, and 36 will energize the electronic timing circuit.

One of the selections made while manually setting the switches or as a result of selecting a given programmed cycle of operations is that of establishing the duration of the washing operation. In the present embodiment this is accomplished by the closing of at least one of the switches 48 or 49. If, for example, switch 48 is closed, the duration of the washing operation as controlled by the electronic timing means will be dependent upon the charging time of capacitor 43 as fed through resistor 44 and as determined through well-known R–C calculations. However, if switch 49 is closed, capacitor 43 will be fed through resistor 45 and a washing time will result which is dependent upon the charging time of capacitor 43 as fed through resistor 45. It should also be noted that more than one resistor, such as resistor 44 and resistor 45, may be energized simultaneously, in a parallel circuit, to provide additional selectable durations for the washing operation or other selected operations.

During the period of energization of the electronic timing means the automatic washing machine will continue to perform the washing operation while the capacitor is being charged to a predetermined charge in a predetermined time period as determined by the value of the resistance in series with the capacitor 43. If, for example, switch 48 were closed prior to the initiation of the cycle for the purpose of obtaining a ten minute wash period, a circuit would be completed to capacitor 43 through resistor 44. As indicated in FIGURE 2, three increments, of one-half minute duration each, are provided on the cam profile for timing the wash operation; thus, a wash period of ten minutes would be achieved by providing a capacitor charging time of eight and one-half minutes. The value of resistor 44 and capacitor 43 would be predetermined so as to provide a charging time of eight and one-half minutes.

By the same method a washing time of three minutes, for example, may be achieved by selecting a resistor for use as resistor 45 to provide a capacitor charging time of one and one-half minutes, which with the one and one-half minutes of cam controlled operation would provide the total desired wash time of three minutes.

It should further be noted that more than one resistor may be energized simultaneously, in a parallel circuit, for example, to provide still further variable durations of operation for selected operations.

Upon energization of the electronic timing circuit, capacitor 43 is fed by a circuit from power line $L_1$ through line 68 and line 60 to timer switch 24 made to timer switch contact 34, line 41, and line 74 to rectifier 40, line 75 to timer switch 25 made to contact 35, resistor 44, and through switch 48 and line 46 to capacitor 43. The other side of capacitor 43 is connected through resistor 50 and line 51 to power line $L_2$. Upon reaching the predetermined charge, capacitor 43 will be discharged through neon tube 53 which will thus emit a visible light for illuminating photoelectric cell 54. Upon illumination, photoelectric cell 54 becomes a conductor and allows a circuit to be completed to relay 55. Upon energization of relay 55 switch members 58 and 59 will be closed for maintaining relay 55 energized and for re-energizing timer motor 10. Timer motor 10 is thus energized by a circuit between power lines $L_1$ and $L_2$ as follows: power line $L_1$ and line 68 to one side of timer motor 10, line 76 and line 61, and through switch 59 to power line $L_2$.

Following energization of timer motor 10 through a circuit including relay switch 59 for the period of one increment the cam stack will be advanced and the recess of timer cam 13 will allow timer switch 23 to make to contact 33 for maintaining timer motor 10 energized independently of switch 59. This circuit for energizing timer motor 10 under control of timer mechanism 20 is from power line L₁ and line 68 to one side of timer motor 10, and line 76 and line 61 to timer switch 23 made to contact 33 and line 78 to power line L₂. Simultaneously with or following the closing of switch 23 to contact 33 for energizing timer motor 10, switches 24, 25, and 26 will be opened at contacts 34, 35, and 36 for de-energizing the electronic timing circuit and thus de-energizing relay 55 for opening switch members 58 and 59.

The timer mechanism will then continue to control the automatic washing machine through the remainder of the washing cycle as in a conventional washing cycle as shown in FIGURE 2. The balance of the washing cycle may consist of a spin operation, a rinse operation, and a final spin dry operation.

The enlarged view of a representative timer cam, cam 13 for example, is shown in FIGURE 2 to illustrate the sequencing of operations of the present invention. In the present embodiment a timer mechanism is utilized which includes a 7.2°, one-half minute escapement. Other escapements would, of course, be required for other applications. With such an escapement a wash operation of ten minutes would require twenty increments of the timer cam profile. With the present invention, however, it is seen in FIGURE 2 and from the above explanation that the wash operation requires only three increments. The remainder of the washing cycle, including spin, rinse, and spin dry, is then controlled by the timer mechanism and utilizes the conventional number of increments of cam profile. It is thus seen that this invention enables a complete cycle of operations to be placed on approximately one-half of the cam profile and occupying twenty-five increments of cam profile. Thus a balance of twenty-five increments out of the available fifty may be used to sequence the washing machine through a specialized cycle of operation, such as a "wash and wear" cycle or a "wool" cycle in which the sequence of operations does not correspond to those of the conventional washing cycle.

It should also be noted that the electronic timing circuit may be programmed for energization during other operations of the washing cycle, such as during the rinse or spin portions, to further condense the normal or regular cycle onto a smaller portion of the cam profile.

Thus it has been shown that the present invention provides a timing control which increases the effective total control time of the timer mechanism by incorporating electronic timing means operative during de-energization of the timer mechanism.

The present invention provides a means for achieving variable operation times, such as a relatively long washing time and a relatively short washing time. For example, in a cycle of operation for an automatic washing machine the washing portion of the cycle, for example, may be varied within a wide range of operating times, say from three minutes to ten minutes, by providing a plurality of selectable resistors for varying the charging time of the capacitor and thus the duration of the secondary timing cycle.

It is seen that the present invention achieves a twofold advantage by achieving greater utilization of the cam profile for performing switching operations and also by achieving a plurality of selectable operation times.

It is further seen that the present invention provides advantages over previous devices used for interrupting the timing cycle, such as thermostats or pressure responsive switches, since the electronic timing circuit provides a timing means which enables predetermination of the time duration.

In the drawings and specification, there has been set forth a preferred embodiment of the invention, and although specific terms are employed, these are used in a generic and descriptive sense only, and not for purposes of limitation. Changes in form and proportion of parts as well as the substitution of equivalents are contemplated, as circumstances may suggest or render expedient, without departing from the spirit or scope of this invention as further defined in the following claims.

I claim:

1. In an automatic control system for controlling a plurality of electrically operated devices through a number of operations by sequencing means for sequentially energizing and de-energizing said electrically operated devices, the combination comprising: first timing means for timing a plurality of sequential operations having drive means for timing the advance of said sequencing means; electrical power supply means for energizing said drive means to advance the sequencing means through a number of operations; switch means for opening and closing said electrical power supply means to substantially immediately de-energize and energize said drive means; second timing means for timing at least a portion of an operation having time delay circuit means including a capacitor and having a first electrical condition and operable to a second electrical condition after a predetermined time period; means for energizing said time delay circuit means and mechanically connected to said switch means for maintaining said electrical power supply means to said drive means of said first timing means de-energized throughout said predetermined time period of said second timing means; and actuation means responsive to said second electrical condition of said second timing means for energizing said drive means of said first timing means.

2. In an automatic control system for controlling a plurality of electrically operated devices through a number of operations by sequencing means for sequentially energizing and de-energizing said electrically operated devices, the combination comprising: first timing means for timing a plurality of sequential operations having drive means for timing the advance of said sequencing means; electrical power supply means for energizing said drive means to operate said sequencing means through a series of operations; switch means for opening and closing said electrical power supply means to substantially immediately de-energize and energize said drive means; second timing means for timing at least a portion of an operation having a capacitance-resistance circuit for sequentially effecting a first condition followed by a second condition after a predetermined time period; means for energizing said capacitance-resistance circuit and mechanically connected to said switch means for maintaining said electrical power supply means to said drive means de-energized throughout said predetermined time period; and actuation means responsive to the second condition of said second timing means for energization of said drive means of said first timing means and initiating de-energization of said second timing means.

3. In an automatic control system for controlling a plurality of electrically operated devices through a series of operations by sequencing means for sequentially energizing and de-energizing said electrically operated devices, the combination comprising: first timing means for timing a plurality of sequential operations having drive means for timing the advance of said sequencing means; electrical power supply means for substantially immediately energizing said drive means and initiating said series of operations; control means for switching off said electrical power supply means and de-energizing said drive means during at least a portion of one operation in said series of operations; second timing means for timing at least a portion of an operation having capacitance means and having a first electrical condition and for effecting a second electrical condition of said second timing means after a predetermined period; and actuation means associated with said second timing means responsive to said second electrical condition for switching on said electrical power supply means to said first timing means and re-energizing said drive means.

4. In an automatic control system for controlling a plurality of electrically operated devices through a number of operations by sequencing means for sequentially energizing and de-energizing said electrically operated devices, the combination comprising: first timing means for timing a plurality of sequential operations having drive means for timing the advance of said sequencing means; electrical power supply means for energizing said drive means and initiating said operations; second timing means for timing at least a portion of an operation having timing circuit means including capacitance means and variable resistance means; means for selecting a fixed value of resistance from said variable resistance means to control the charging time of said capacitance means; switch means for opening and closing said electrical power supply means to substantially immediately de-energize and energize said drive means of said first timing means; control means for energizing said capacitance means through said selected fixed resistance to charge said capacitance means to a predetermined charge in a predetermined period and mechanically connected to said switch means for maintaining said electrical power supply means to said drive means of said first timing means de-energized during said predetermined period of said second timing means; and actuation means responsive to said predetermined charge for energizing said drive means of said first timing means.

5. In an automatic control system for controlling a plurality of electrically operated devices through a plurality of operations by sequencing means for sequentially energizing and de-energizing said electrically operated devices, the combination comprising: first timing means for timing a plurality of sequential operations having drive means for timing the advance of said sequencing means; electrical power supply means for substantially immediately energizing said drive means to drive said sequencing means through said operations; second timing means for timing at least a portion of an operation obtained after energizing said drive means, said second timing means having timing circuit means including capacitance means and a plurality of resistance means, means for selecting at least one of said resistance means to control the charging time of said capacitance means; control means associated with said sequencing means for switching off said electrical power supply means to said drive means of said first timing means at a predetermined time and for energizing said timing circuit means to charge said capacitance means to a predetermined charge in a predetermined period; and actuation means responsive to said timing circuit means for switching on said electrical power supply means to said drive means.

6. In an automatic control system for controlling a plurality of electrically operated devices through a series of operations by sequencing means for sequentially energizing and de-energizing said electrically operated devices, the combination comprising: first timing means for timing a plurality of sequential operations having drive means for timing the advance of said sequencing means; electrical power supply means for substantially immediately energizing said drive means to initiate said series of operations; second timing means for timing at least a portion of an operation having capacitance means, means for discharging said capacitance means prior to energization of said second timing means; control means for shutting off said electrical supply means and de-energizing said drive means at a predetermined time during said sequence of operations of said first timing means and for energizing said second timing means to charge said capacitance means to a predetermined charge during a predetermined period; and actuation means associated with said second timing means responsive after said predetermined period for switching on said electrical power supply means and reenergizing said drive means of said first timing means.

7. In an automatic control system for controlling a plurality of electrically operated devices through a series of operations by sequencing means for sequentially energizing and de-energizing said electrically operated devices, the combination comprising: first timing means for timing a plurality of sequential operations having drive means for timing the advance of said sequencing means; electrical power supply means for substantially immediately energizing said drive means to initiate said series of operations; second timing means for timing at least a portion of an operation having capacitance means for timing a predetermined period; control means for switching off said electrical power supply means and de-energizing said drive means at a first predetermined time during said sequence of operations of said first timing means and for energizing said second timing means to charge said capacitance means to a predetermined charge over a predetermined period; and actuation means associated with said second timing means responsive after said predetermined period for re-energizing said drive means of said first timing means, said control means being still further operative for de-energizing said second timing means following re-energization of said drive means of said first timing means at a second predetermined time.

8. In an automatic control system including a sequencing means having sequentially operated switches for controlling a plurality of electrically operated devices through a series of operations, the combination comprising: first timing means for timing a plurality of sequential operations having drive means for timing the advance of said sequencing means; electrical power supply means for energizing said drive means; first switch means for switching on said electrical power supply to said drive means and initiating said sequence of operations, control means for switching off said electrical power to said drive means at a predetermined time in said series of operations; second timing means for timing at least a portion of an operation having timing circuit means including capacitance means and a plurality of resistance means, second switch means for energizing said second timing means, said control means being further operative for actuating said second switch means and energizing said timing circuit means at said predetermined time; selection means for selecting at least one of said resistance means to control the charging time of said capacitance means, said capacitance means being chargeable through said timing circuit means to a predetermined charge during a predetermined period; and actuation means responsive to said timing circuit means for switching on said electrical power means and re-energizing said drive means, said control means being further operative for de-energizing said timing circuit means following re-energization of said drive means whereby the effective duration of sequential control of said sequencing means is increased to the extent of said predetermined period.

9. In an automatic control system for controlling an appliance having at least one sequentially operable device by sequencing means for altering the condition of operation of said sequentially operable device in a predetermined sequence to comprise a series of operations of said appliance, the combination comprising: first timing means for timing a plurality of sequential operations having drive means for timing the advance of said sequencing means; electrical power supply means for substantially immediately energizing said drive means; second timing means for timing at least a portion of an operation having a time delay circuit means including a capacitor and having a first electrical condition; means for switching off said electrical power supply means to said drive means and for energizing said second timing means at a predetermined position of said sequencing means, said time delay circuit means being operative from said first electrical condition to a second electrical condition after a predetermined time delay following said energization of said second timing means; and actuation means responsive to said second timing means at said second electrical condition for switching on said electrical power means to energize said drive means of said first timing means.

References Cited

UNITED STATES PATENTS

| | | | |
|---|---|---|---|
| 3,262,042 | 7/1966 | Amos | 318—443 |
| 3,070,714 | 12/1962 | Jacobs | 307—141 |
| 3,171,045 | 2/1965 | Jacobs | 307—141 |
| 3,221,174 | 11/1965 | Jacobs | 307—141 XR |

ORIS L. RADER, *Primary Examiner.*

T. B. JOIKE, *Assistant Examiner.*